(12) United States Patent
Rohde et al.

(10) Patent No.: US 6,893,603 B2
(45) Date of Patent: May 17, 2005

(54) PRODUCTION OF HOLLOW PLASTIC ARTICLES

(75) Inventors: Wolfgang Rohde, Speyer (DE); Dieter Boes, Wiesloch (DE); Michael Flosdorff, Appenweior-Urloffen (DE); Jörg Schnorr, Ludwigshafen (DE); Bernhard Springholz, Worms (DE); Roger Weinlein, Mannheim (DE); Andreas Wüst, Zwingenberg (DE)

(73) Assignee: Basell Polyolefine GmbH (DE)

( * ) Notice: Subject to any disclaimer, the term of this patent is extended or adjusted under 35 U.S.C. 154(b) by 536 days.

(21) Appl. No.: 09/938,756

(22) Filed: Aug. 24, 2001

(65) Prior Publication Data

US 2002/0024171 A1 Feb. 28, 2002

(30) Foreign Application Priority Data

Aug. 28, 2000 (DE) ........................................ 100 42 121

(51) Int. Cl.$^7$ .............................................. B29C 49/20
(52) U.S. Cl. ....................... 264/516; 264/515; 264/545; 264/146; 264/152
(58) Field of Search ................................ 264/516, 515, 264/545, 146, 152

(56) References Cited

U.S. PATENT DOCUMENTS 3,733,381 A    5/1973   Willette et al.
4,952,347 A  * 8/1990   Kasugai ........................ 264/457
5,129,544 A    7/1992   Jacobson et al. ............ 220/562
5,474,734 A   12/1995   Akazawa et al.

FOREIGN PATENT DOCUMENTS

| | | |
|---|---|---|
| DE | 100 10 900 A1 | 9/2001 |
| EP | 0 419 068 A2 | 3/1991 |
| FR | 2 420 415 | 10/1979 |
| FR | 2 521 064 | 8/1983 |
| GB | 1 410 215 | 10/1975 |
| JP | 58 202112 | 11/1983 |
| JP | 59 091025 | 5/1984 |
| JP | 61 261021 | 11/1986 |
| JP | 09 001640 | 1/1997 |
| JP | 11 320663 | 11/1999 |

* cited by examiner

Primary Examiner—Suzanne E. McDowell
(74) Attorney, Agent, or Firm—Connolly Bove Lodge & Hutz LLP

(57) ABSTRACT

The present invention relates to a process for producing hollow plastic articles, encompassing the following steps:
a) producing a tubular plastic parison on a blow molding plant or coextrusion blow molding plant
b) cutting open the extruded or coextruded plastic parison to give at least one semifinished open-surface product
c) thermoforming the resultant semifinished open-surface product to give half-shells
d) welding the thermoformed half-shells to give a hollow article.

18 Claims, No Drawings

PRODUCTION OF HOLLOW PLASTIC ARTICLES

The present invention relates to a process for producing hollow plastic articles. The present invention further relates to hollow plastic articles which can be produced by the abovementioned process, and also to their use, for example as plastic fuel tanks in motor vehicles.

Hollow plastic articles for the storage and transport of hazardous liquids have been known for a long time. Particularly in automotive construction, hollow plastic articles in the form of fuel tanks have almost completely replaced the tanks made from metallic materials and usually used hitherto. Nowadays, containers of all types which are portable or movable are produced almost exclusively from plastics, examples being gasoline canisters, plastic bottles, plastic drums, and plastic containers for combustible liquids, hazardous materials, and the like. The particular advantage of plastic containers and tanks is especially their lower weight/volume ratio and the elimination of corrosion problems, and also their low-cost manufacture.

Various processes can be used for producing hollow plastic articles. Besides the process known as rotational sintering, use is particularly made of blow molding for large-scale mass production, and this includes coextrusion blow molding.

The existence worldwide of legal requirements for the reduction of ozone-forming emissions, such as fuel-related emissions, means that plastic fuel tanks (PFTs) in all vehicles have to prevent discharge of fuels under stationary and operating conditions. If the plastic used to produce a plastic fuel tank does not have inherent barrier properties, additional measures have to be taken to reduce permeation.

The polyolefins frequently used for producing plastic fuel tanks have only a low level of barrier action with respect to the permeation of volatile nonpolar substances. Processes which can considerably improve the barrier properties of plastic fuel tanks made from polyethylene, for example, include fluorination (in-line or off-line), painting or coating, plasma polymerization, blending (Selar® process), and coextrusion processes (incorporation of various barrier polymers in a composite of two or more layers).

The only processes other than coextrusion blow molding which have achieved industrial significance are fluorination and the Selar® process. Fluorination processes known from the prior art are coating processes in the widest sense. A fundamental disadvantage of all coating processes is that the barrier layer(s) must be applied to the inner and/or outer surface of the container, and are therefore exposed unprotected to the effects of the environment. In the course of time, the barrier layer can peel away or even undergo chemical alteration, with consequent significant impairment of barrier properties. The strict legal requirements placed upon the long-term stability of the barrier action mean that coating processes such as fluorination will increasingly lose significance in the future. Another factor reinforcing this development is that to fulfill legal requirements relating to the avoidance of fuel emissions from the fuel system it is increasingly necessary to integrate parts within the interior of the tank. The parts, such as lines or valves, may be incorporated either prior to or after any coating process which has to be carried out. It is only possible to incorporate parts prior to the coating process if the incorporated parts are not damaged by the coating process. If the coating takes place prior to incorporation of any parts, it has to be assumed that the coating becomes damaged at the attachment points (welds) in the tank.

For the abovementioned reasons, current developments are concentrated on the production and build-up of systems having two or more layers. For example, the process of multilayer coextrusion is used to introduce barrier layers into the container wall. Here, barrier polymers are embedded into a supporting polymer matrix by way of adhesion promoters. Usually, the location of the barrier polymer is approximately in the middle of the container wall. This firstly minimizes the flexural stresses arising within the barrier polymers, which are mostly relatively brittle, when a mechanical load is applied. Secondly, the matrix material, such as polyethylene, protects the barrier polymer from the effects of the environment—particularly water.

One process used to build up hollow articles having two or more layers is the abovementioned coextrusion blow molding process. Blow molding or coextrusion blow molding is a widespread technique which, however, has the disadvantage that the integration of components, such as fuel system components, after production of the hollow plastic article is impossible or possible only to a very limited extent.

Another production process known from the prior art, known as the thermoforming process or twin-sheet process, begins by manufacturing two half-shells by thermoforming appropriate semifinished sheets, and welds these to one another in a second step of the process. However, one of the fundamental disadvantages of this process is that there is limited controllability of wall-thickness distribution in the tank half-shells. The impossibility of sufficiently controlling the wall-thickness distribution, and therefore the barrier-layer thickness distribution, stems from the fact that the semifinished sheets have a uniform wall thickness and therefore depending on the stretching ratios during thermoforming the wall thickness and, respectively, the barrier-layer thickness can undergo severe local reductions.

Another process for producing hollow plastic articles having two or more layers is based on the injection molding process known from the prior art. One considerable disadvantage of these processes is that shells having two or more layers have to be built up either by in-mold coating thick-walled films which have two or more layers and have to be produced in a separate process or else by using two steps in succession of bilateral in-mold coating of thinner films, which likewise have to be produced in a separate process. In either case, therefore, two or more steps in the process are a fundamental requirement, as are considerable equipment costs and therefore high production costs for hollow plastic articles having two or more layers.

DE 198 14 314 describes what is called a melt compression process. Here, a coextruded parison, for example in the form of a tube from a blow molding plant, is placed in a mold and pressed using a ram or negative mold, to give a half-shell. A disadvantage is that prior to the welding process the ram has to be removed from the mold, and welding the product while hot is therefore impossible. In addition, the pressing process gives a marked compressive flow of melt parallel to the mold surface. Although this permits good control of the total wall thickness by way of the geometric dimensions of mold and ram, there can be local thinning of the barrier polymer melt, which is mostly highly fluid. This in turn means that the barrier action is non-uniform across the hollow plastic article.

The explanation above shows that the processes known from the prior art for producing hollow plastic articles have a large number of serious disadvantages.

It is an object of the present invention, therefore, to meet the urgent need for a process for producing hollow plastic articles while avoiding the abovementioned disadvantages of the prior art. A further object of the present invention is to develop a process which continues to use the coextrusion blow molding plants or blow molding plants which already exist and are widespread in industry. Further objects are clear from the description of the invention below.

We have found that this object is achieved, with respect to the process, by the features of claim 1.

Advantageous embodiments of the process of the invention are defined in the process subclaims.

The invention provides a process for producing hollow plastic articles, encompassing the following steps:

a) producing a tubular plastic parison on a blow molding plant or coextrusion blow molding plant
b) cutting open the extruded or coextruded plastic parison to give at least one semifinished open-surface product
c) thermoforming the resultant semifinished open-surface product to give half-shells
d) welding the thermoformed half-shells to give a hollow article.

The process of the invention for producing hollow plastic articles has been found to avoid these disadvantages of the processes known from the prior art. The principle of the process of the invention for producing hollow plastic articles consists in cutting open, in an axial direction, a plastic parison produced on a blow molding plant or coextrusion blow molding plant, and inserting the resultant semifinished open-surface products in the form attained by the melt into two thermoforming molds and thermoforming these products to give the desired shape. This gives two half-shells which can then be welded to one another, using the heat from thermoforming. Producing the semifinished open-surface products via a blow molding plant permits controlled and reproducible wall-thickness regulation and thus high design freedom. If a coextrusion blow molding plant is used, layers made from barrier polymers may be integrated into the semifinished product. If the semifinished product is manufactured as a single layer on a blow molding plant, barrier layers may be applied subsequently, for example by fluorination or painting. These coatings are preferably applied after the half-shells have been welded together. However, the coating procedures may also take place prior to the welding process and, where appropriate, prior to or after the attachment of incorporated parts on the half-shells.

The present invention also provides a hollow plastic article which can be produced by the process described above. The invention intends that the hollow plastic articles produced by the process of the invention preferably be used as plastic fuel tanks in motor vehicles, or else as gasoline canisters, plastic tanks for storing or transporting heating oil, diesel, or the like, transport containers on utility vehicles, for example for agricultural sprays, solvent containers, plastic bottles, or the like.

Another advantage of the production process of the present invention is that prior to the welding of the thermoformed semifinished products it is possible without difficulty, where appropriate, to attach incorporated parts, such as components of a fuel system, to the inner side of the half-shells. The invention therefore provides that, prior to the welding of the thermoformed semifinished products, incorporated parts are attached to the inner side of the half-shells, for example ventilation lines for pressure equilibration within the tank, fuel lines for equilibration of liquids within the tank, valves, anti-surge cups, or pump-related and/or tank sensor modules.

The welding of the thermoformed semifinished products preferably takes place using the heat of thermoforming, that is to say that the half-shells with the heat of the melt after thermoforming are directly welded to one another. In the process of the invention it is advantageous for no cooling or removal from the mold or post treatment to take place prior to the welding of the two semifinished products. In one particularly preferred embodiment of the process, no additional heating steps or cooling steps are needed in order to produce the hollow plastic article from the (co)extruded tubular parison with its melt-derived heat.

Another significant advantage of the process of the invention is that the wall thickness of the plastic parison can be regulated as desired in the coextrusion blow molding plant used. The precise regulation of the wall thickness of the parison in the coextrusion blow molding plant leads to a significant improvement in wall-thickness control during the thermoforming process which follows. The diameter and, respectively, the circumference of the plastic parison is controlled via the diameter of the die on the extrusion blow molding head, and should be adapted to the requirements of the subsequent steps of the process. The wall thickness of the plastic parison may be regulated in an axial direction during the extrusion process with the aid of the variable die gap. Radial wall-thickness control can also be achieved if use is made of profiled die/mandrel pairs or of flexible die rings which can be deformed using suitable actuators (partial wall-thickness control).

Once the plastic parison has been extruded to a desired length, which, where appropriate, should be adapted to the requirements of the subsequent steps of the process and of the geometry of the finished product, the parison is cut open, giving at least one, preferably two or more, for example three or four, semifinished open-surface products. In one preferred embodiment, the cutting open of the plastic parison takes place prior to separation from the die, i.e. straight away during the extrusion process or immediately after the extrusion process.

In another particularly preferred embodiment, prior to the cutting process, the plastic parison is extended perpendicularly to the direction of extrusion, with the aid of a spreading device. If only one side of the tubular parison is cut open, the result is a large-surface-area semifinished product which can be laid over a thermoforming mold with two chambers for upper and lower shell, and can therefore be used to produce two half-shells which are then separated from one another and welded. It is preferable for two sides of the tubular parison to be cut open, giving two semifinished open-surface products, each of which is molded into a thermoforming mold. The invention also provides that the parison can be cut up into more than two parts and, where appropriate, the finished product can be manufactured from more than two component shells.

The resultant plastic parts are then further processed by thermoforming to give semifinished products of half-shell type. Use may also advantageously be made of existing coextrusion blow molding plants for the process of the invention. The blow molding plants would merely have to be supplemented by appropriate cutting units, preferably robots, and thermoforming units, and in principle it is also possible here to use the existing clamping units of the blow molding plants for the processes of thermoforming, integration, and welding.

The invention provides that robots be used for individual steps of the process, in particular for the removal, the transport, and the cutting of the plastic parison.

Since the plastic material is subject to high loads, and since requirements are high, for example with regard to barrier action, the structure of the hollow plastic articles produced according to the process of the invention preferably has two or more layers.

The structure of the hollow plastic articles of the invention preferably has at least two layers. In these layers there is always a supporting base layer, which usually forms the inner surface of the hollow article. This layer therefore has decisive importance for the leakproof nature and mechanical stability of the container.

In one particular embodiment, the plastic parison produced has at least one layer made from polymeric material, preferably selected from the group consisting of polyethylene, polypropylene, polyvinyl chloride, polyamide, polyketone, polyester, and mixtures of these.

In another preferred embodiment, the structure of the plastic parison has two or more layers, encompassing preferably base layer, regrind layer, adhesion-promoter layer, and/or barrier layer.

The layer thickness distribution within the finished product and therefore within the parison depends on the number of layers. The layer thickness distribution in a plastic parison produced by the process of the invention and whose structure has six layers is given below. In one particularly preferred embodiment, the structure of the plastic parison or, respectively, the hollow plastic article has six layers, encompassing, from the outside to the inside:

a layer made from HDPE with a thickness of from 5 to 30%,
a regrind layer with a thickness of from 10 to 82%,
an adhesion-promoter layer with a thickness of from 1 to 5%,
a barrier layer with a thickness of from 1 to 10%,
an adhesion-promoter layer with a thickness of from 1 to 5%,
a layer made from HDPE with a thickness of from 10 to 40%, based in each case on the total thickness of the container wall.

Suitable base materials encompass high-density polyethylene (HDPE) with a density of from 0.940 to 0.960 g/cm$^3$, in particular from 0.943 to 0.955 g/cm$^3$, and particularly preferably from 0.943 to 0.950 g/cm$^3$. The melt flow rate of the polyethylene materials suitable according to the invention is from 1.5 to 20 g/10 min (MFR (190° C./21.6 kg)), in particular from 2 to 10 g/10 min, and particularly preferably from 3 to 8 g/10 min. Other abovementioned polymeric materials are, of course, also suitable as supporting base material.

Suitable barrier materials encompass ethylene-vinyl alcohol copolymer (EVOH), polyamide, or else other barrier polymers, such as polyesters, in particular polybutylene terephthalate, fluoropolymers, such as polyvinylidene fluoride, ethylene-tetrafluoroethylene copolymer (ETFE), tetrafluoroethylene-hexafluoropropylene-vinylidene fluoride copolymers (THV), and also liquid-crystalline polymers (LCP). Other suitable materials are mixtures of the abovementioned barrier materials with what are known as nanoparticles. For the purposes of the present invention, nanoparticles are inorganic phyllosilicates whose atomic layers have been opened up and thus given a looser structure by intercalated organic molecules. The atomic layers may be separated via incorporation into polymeric materials, bringing about extremely fine distribution of the particles. The surface of the dispersed particles lengthens to an extreme degree the diffusion path of any permeating molecule, and this reduces permeation.

Suitable adhesion promoters according to the invention encompass polar-modified polyethylenes (HDPE or LLDPE and LDPE). The polar modification usually takes place via graft copolymerization with polar molecules having carbon-carbon double bonds, such as fumaric acid, maleic acid, or else maleic anhydride. The grafted polyethylenes may also undergo further chemical modification in subsequent reactions, for example by introducing amino groups. The copolymers of ethylene with vinyl acetate are also suitable in principle as adhesion promoters, as are acrylic acid and, respectively, its esters.

The layer known as the regrind layer is preferably produced from what is known as flash, arising, for example, during the production of the hollow plastic articles, in the form of residues of material or residues from production.

In another preferred embodiment according to the invention, after the welding of the two thermoformed semi-finished products, the hollow plastic article is provided with an additional permeation-reducing coating. Examples of ways of obtaining the permeation-reducing coating are by direct fluorination, painting, or plasma polymerization of the plastic containers.

It is expressly pointed out that the description of the process of the invention below merely gives examples of possible embodiments. The invention also provides other embodiments which likewise incorporate the principle of the process of the invention.

A plastic parison is first produced in the first step of the process of the invention. One way of doing this is to use a 6-layer coextrusion blow molding plant as produced and marketed by Krupp Kautex Maschinenbau. Coextrusion gives a tubular parison whose structure has six layers. The layer structure of the parison corresponds to the structure described above (from the outside to the inside: HDPE, regrind, adhesion promoter, barrier polymer, adhesion promoter, HDPE). The layer thickness distribution of the parison is likewise within the ranges specified above.

During the coextrusion process, the parison wall thickness is adapted to the geometry of the finished product in such a way that a very homogeneous wall thickness distribution without thin areas is produced in the finished product. To regulate the parison wall thickness here use is made of a suitable program which regulates the die gap as a function of time (WTC) and also, where appropriate, of radial die gap control (PWTC). The wall thickness distribution is regulated in accordance with the requirements placed upon the mechanical performance of the material and also, in the case of plastic fuel tanks, in accordance with the required fire performance. The diameter and, respectively, the circumference of the parison tube is adapted to the requirements of the mold and can be set without difficulty via the choice of die diameter.

The plastic parison is extruded to the length required for the particular mold. The invention provides that the parison may be extruded by way of a suitable spreading device which in the simplest case is composed of two bars mounted vertically and capable of being moved away from one another hydraulically, for example. If the two bars arranged parallel or else at an angle to one another and located in the interior of the parison tube are moved away from one another, the melt over the entire length of the parison tube experiences extension perpendicular to the direction of extrusion. The spreading device described above may, of course, also be of multipart design, permitting the parison tube to be subjected to various controlled degrees of extension or spreading in an axial direction. The use of a spreading device to shape the material provides not only a method of controlled preshaping of the coextruded tube but, moreover, a method of controlling the wall thickness of the parison by way of the spreading procedure mentioned.

The resultant plastic parison is separated below the die of the extrusion head. The parison, clamped and held in the spreading device and in the form of the melt, is then swung out of the parison extrusion area so that in the next operation it can be cut open along at least two lines matched to the requirements of the subsequent steps of the process and of the finished product. To this end, holding devices are brought up to both sides of the plastic parison. These are capable of securing and positioning the halves of the parison which are produced in the cutting process. Examples of suitable holding devices are suction heads. The separation and transport of melt tubes is a process step known in the prior art and is described in detail in EP 0 653 286, for example. The partitioning of the plastic parison in an axial direction preferably takes place using robots, which permit three-dimensional control of the cutting tools. In this way it is possible for the open-surface shape of the semifinished product to be adapted to the edge contours of the thermoforming mold, and this makes it possible to minimize the proportion of flash produced. If desired, it is also possible for the melt tube to be cut up in an axial direction straight away during the extrusion process or else immediately thereafter, prior to separation from the die. If the cutting-up process takes place during the extrusion process, the semifinished open-surface product may itself be stretched perpendicularly to the direction of extrusion.

The next step then brings the resultant semifinished open-surface products, which mostly have the shape of sheets, to the two thermoforming molds, preferably located opposite to one another. Robots may also carry out this function. Where appropriate, the thermoforming molds have different shapes, for example for the upper and, respectively, lower portion of the hollow plastic article to be manufactured. The semifinished products in the form of the melt are sucked into the thermoforming mold by applying subatmospheric pressure, and it is possible here to use an appropriate pressure/time profile to optimize further the multiaxial extension of the melt and thus also the wall thickness distribution in the half-shells to be manufactured.

Once the semifinished products have been introduced into the thermoforming molds, incorporated parts are, where appropriate, assembled into the half-shells. It is possible, for example, to insert ventilation lines for pressure equilibration within the tank, fuel lines for equilibration of liquid within the tank, valves, anti-surge cups, or pump-related and/or tank sensor modules into a plastic fuel tank during its production, and to weld these to the inner surface, which retains the heat of the melt. For this process, too, it is preferable to use robots. In the final step of manufacture, the two half-shells still located in the molds are brought together and welded to one another by pressing the two molds together. Here, those portions of the two semifinished products which lie on the face sides of the mold halves are brought into contact with one another and welded. The design of the molds and of their clamping movements should be such that when the half-shells are pressed together material can flow into suitable chambers during the welding procedure, so that the geometry of the welded seam can be matched to the requirements placed upon component strength and also upon prevention of fuel permeation. Following the joining operation, the tank is demolded, observing the cooling times required by the process.

We claim:

1. A process for producing hollow plastic articles, encompassing the following steps:

a) producing a tubular plastic parison on a blow molding plant or coextrusion blow molding plant
    b) cutting open the extruded or coextruded plastic parison to give at least one semifinished open-surface product
    c) thermoforming the resultant semifinished open-surface product to give half-shells
    d) welding the thermoformed half-shells to give a hollow article, and wherein the welding of the thermoformed half-shells takes place using the heat of thermoforming.

2. A process as claimed in claim 1, wherein the plastic parison has at least one layer made from polymeric material, selected from the group consisting of polyethylene, polypropylene, polyvinyl chloride, polyamide, polyketone, polyester, and mixtures thereof.

3. A process as claimed in claim 1, wherein the structure of the plastic parison has two or more layers.

4. A process as claimed in claim 1, wherein the structure of the plastic parison has two or more layers, encompassing, from the outside to the inside:

a layer made from HDPE with a thickness of from 5 to 30%,
    a regarding layer with a thickness of from 10 to 82%,
    an adhesion-promoter layer with a thickness of from 1 to 5%,
    a barrier layer with a thickness of from 1 to 10%,
    an adhesion-promoter layer with a thickness of from 1 to 5%, and
    a layer made from HDPE with a thickness of from 10 to 40%, based in each case on the total thickness of the container wall.

5. A hollow plastic article produced by the process as claimed 1.

6. A process for producing hollow plastic articles, encompassing the following steps:

a) producing a tubular plastic parison on a blow molding plant or coextrusion blow molding plant
    b) cutting open the extruded or coextruded plastic parison to give at least one semifinished open-surface product
    c) thermoforming the resultant semifinished open-surface product to give half-shells
    d) welding the thermoformed half-shells to give a hollow article, and which proceeds without any additional heating steps or cooling steps.

7. A process as claimed in claim 6, wherein the plastic parison has at least one layer made from polymeric material, selected from the group consisting of polyethylene, polypropylene, polyvinyl chloride, polyamide, polyketone, polyester, and mixtures thereof.

8. A process as claimed in claim 6, wherein the structure of the plastic parison has two or more layers.

9. A hollow plastic article produced by the process of claim 6.

10. A process for producing hollow plastic articles, encompassing the following steps:

a) producing a tubular plastic parison on a blow molding plant or coextrusion blow molding plant
    b) cutting open the extruded or coextruded plastic parison to give at least one semifinished open-surface product
    c) thermoforming the resultant semifinished open-surface product to give half-shells
    d) welding the thermoformed half-shell to give a hollow article, and wherein, prior to the cutting process, the tubular plastic parison is extended perpendicularly to the direction of extrusion, with the aid of a spreading device.

11. A process as claimed in claim 10, wherein the plastic parison has at least one layer made from polymeric material, selected from the group consisting of polyethylene, polypropylene, polyvinyl chloride, polyamide, polyketone, polyester, and mixtures thereof.

12. A process as claimed in claim 10, wherein the structure of the plastic parison has two or more layers.

13. A hollow plastic article produced by the process of claim 10.

14. A process for producing hollow plastic articles, encompassing the following steps:
   a) producing a tubular plastic parison on a blow molding plant or coextrusion blow molding plant
   b) cutting open the extruded or coextruded plastic parison to give at least one semifinished open-surface product
   c) thermoforming the resultant semifinished open-surface product to give half-shells
   d) welding the thermoformed half-shells to give a hollow article, and wherein the cutting of the plastic parison takes place prior to separation from the die, i.e. straight away during the extrusion process or immediately following the same.

15. A process as claimed in claim 14, wherein the semifinished open-surface products are stretched perpendicularly to the extrusion device.

16. A process as claimed in claim 14, wherein the plastic parison has at least one layer made from polymeric material, selected from the group consisting of polyethylene, polypropylene, polyvinyl chloride, polyamide, polyketone, polyester, and mixtures thereof 17. A process as claimed in claim 14, wherein the structure of the plastic parison has two or more layers.

18. A hollow plastic article produced by the process of claim 14.

* * * * *

UNITED STATES PATENT AND TRADEMARK OFFICE
CERTIFICATE OF CORRECTION

| | | |
|---|---|---|
| PATENT NO. | : 6,893,603 B2 | Page 1 of 1 |
| DATED | : May 17, 2005 | |
| INVENTOR(S) | : Wolfgang Rohde et al. | |

It is certified that error appears in the above-identified patent and that said Letters Patent is hereby corrected as shown below:

<u>Column 8,</u>
Line 66, delete "shell" and insert -- shells --.

Signed and Sealed this

Fourth Day of October, 2005

JON W. DUDAS
*Director of the United States Patent and Trademark Office*